(No Model.)
A. V. MESEROLE.
ELECTRODE FOR SECONDARY BATTERIES.
No. 408,809. Patented Aug. 13, 1889.
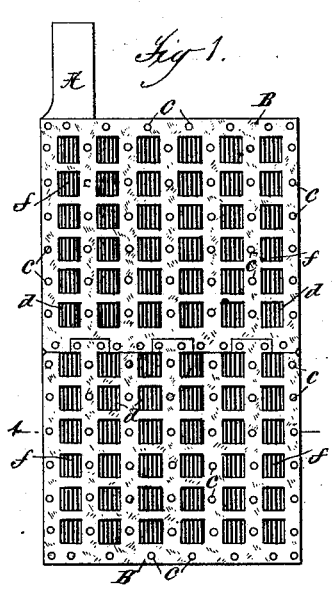
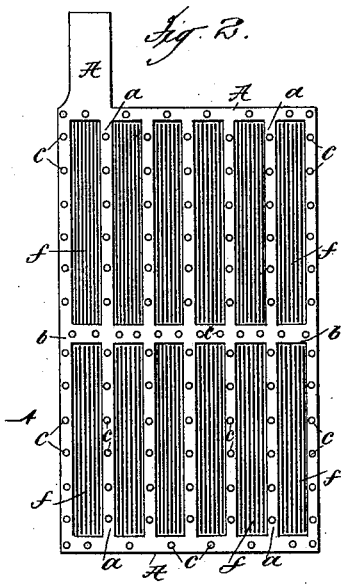
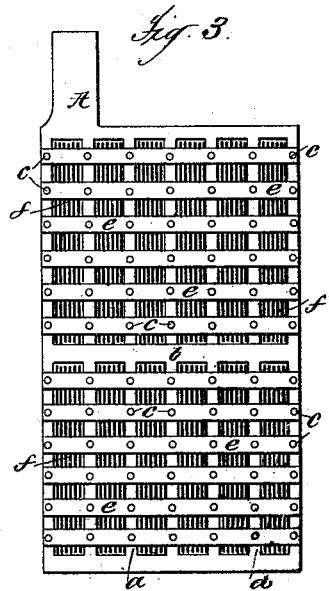
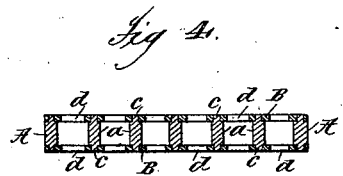
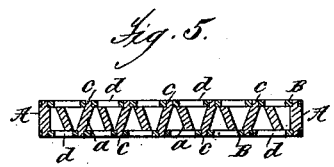
Attest:
Geo. H. Potts.
J. J. Kennedy
Inventor:
Abraham V. Meserole
by Philipp Phelps & Huey
Attys.

UNITED STATES PATENT OFFICE.

ABRAHAM V. MESEROLE, OF NEW YORK, N. Y., ASSIGNOR OF ONE-HALF TO HENRY A. WILSON, OF RIDGEFIELD, NEW JERSEY.

ELECTRODE FOR SECONDARY BATTERIES.

SPECIFICATION forming part of Letters Patent No. 408,809, dated August 13, 1889.

Application filed May 27, 1889. Serial No. 312,203. (No model.)

*To all whom it may concern:*

Be it known that I, ABRAHAM V. MESEROLE, a citizen of the United States, residing at New York, county of New York, and State of New York, have invented certain new and useful Improvements in Electrodes for Secondary Batteries, fully described and represented in the following specification and the accompanying drawings, forming a part of the same.

This invention relates to improvements in the construction of electrodes for secondary batteries, the improvements, as herein illustrated and as hereinafter described, being particularly applicable to the batteries of this general class which are known as "Planté batteries," in which the electrodes, composed initially of lead or lead alloy or other inactive metal, are used without the addition of an active material mechanically incorporated therewith, these electrodes being rendered electrically active or electrically receptive by electrical and chemical treatment in any of the ways commonly practiced in the art.

It is the object of the present invention to so construct an electrode of this character that a maximum degree of electrical strength and resistance to distortion will be attained with a minimum quantity of metal and a large surface area for electrical action provided in a relatively small volume, and to construct an electrode having these signal advantages, which shall in addition have the advantages of reliability and durability and convenience and cheapness in manufacture.

To these ends the invention consists of an electrode composed of an inner frame and outer plates united rigidly, said frame being provided with a series of vertically-arranged ribs forming spaces or recesses for containing thin strips or filaments of lead or lead alloy arranged vertically therein, the electrical strength and capacity of the electrode being greatly increased by the addition of these filaments, and said outer plates being provided at suitable intervals with a series of openings for the free access to and circulation about all parts of the electrode of the electrolytic fluid.

The invention further consists of a modification in the construction of the outer plates, which consists in constructing said plates of a plurality of strips united to the inner frame and distanced from each other suitably to provide openings for the passage and circulation of the electrolytic fluid, this construction being in many cases preferred by reason of convenience and cheapness in manufacture.

The invention also consists in a slight modification in the arrangement of the vertical ribs upon the inner frame, which will be hereinafter referred to.

In the accompanying drawings, Figure 1 is an elevation of the complete electrode, illustrating particularly the construction of the outer plates. Fig. 2 is an elevation of the same, partly in section, one of the outer plates being removed to show more clearly the construction of the inner frame. Fig. 3 is an elevation illustrating a modification in the construction of the outer plate, which will be hereinafter described. Fig. 4 is a horizontal section on the line 4 of Fig. 1. Fig. 5 is a similar view illustrating a modification in the construction of the inner frame, which will be hereinafter referred to.

Referring to said drawings, it will be understood that the electrode therein illustrated is of composite form, composed mainly of a pair of outer plates B and an inner frame A, located within the plates B. The frame A, which is of metallic lead or lead alloy or other inactive material, is, as best shown in Figs. 2 and 4, of substantially rectangular form preferably, having a plurality of vertically-arranged ribs *a* extending its entire length, and preferably, for convenience in manufacture, arranged at right angles to the frame, as shown. The frame A is also preferably provided with one or more ribs *b*, extending transversely of the ribs *a*, serving to give additional rigidity and strength to the frame. It has been found preferable in practice to construct the vertical ribs *a* of comparatively thin metal and the transverse ribs *b* of comparatively thick metal, sufficient strength and rigidity being obtained by this construction with a minimum quantity of metal. The inner frame and outer plates A B are united rigidly by means of plugs *c*, of lead or lead alloy, formed upon the ribs *a b* and the frame A and entering openings provided in the outer plates B, in which openings they are permanently secured by welding or melting their ends. By this method of uniting the two plates and frame of the electrode a perfect mechanical and electrical union is secured between the two.

To permit ready access of the electrolytic fluid to the surface of the inner frame A and the inner surface of the outer plates B, and to permit its free circulation about the ribs $a$, the outer plates are provided with a plurality of comparatively large openings $d$, in line, preferably, with the recesses formed by the ribs $a$. This provision of the openings $d$, in addition to rendering the interior surfaces of the plates B and of the frame A available for electrical action, also provides outlets for the escape of gas-bubbles formed in the spaces within the plates B, formed by the ribs $a$ of the frame A, during the process of formation and recharging.

It will be seen from the foregoing that in an electrode thus constructed a large surface is provided for electrical action within a relatively small volume, an electrode of this construction having a large electrical capacity and a correspondingly great degree of mechanical strength, at the same time being convenient and cheap to manufacture and having the advantages of reliability and durability.

To add still further to the capacity and electrical strength of the electrode without increasing its dimensions and without materially increasing its weight, I provide the spaces between the ribs $a$ of the inner frame A with a number of filaments $f$ or thin strips of metallic lead or lead alloy, preferably arranged vertically, as shown, which, being readily acted upon in the electrical formative treatment, add greatly to the electrical capacity and strength of the electrode. The filaments or strips $f$, though preferably arranged vertically and parallel to the ribs $a$ of the inner frame A, may be arranged horizontally or in any other desired position.

Each electrode of the series used in a battery will be insulated from its adjacent electrode by means of insulating-pins arranged at suitable intervals upon the exterior surfaces of the outer plates B or in any other suitable manner. With an electrode thus constructed its effectiveness is increased many fold over the effectiveness of an electrode having plane surfaces, the electrode thus constructed having in addition a mechanical construction effectually resisting distortion.

The filaments or strips $f$, of metallic lead, though in most cases desirable on account of the additional strength and capacity given to the electrode, may be omitted where such strength and capacity are not required or desirable.

Each of the plates B, instead of being constructed in one piece, as heretofore described, may, as shown in Fig. 1, be made up of two or more sections united together and secured to the inner frame A, or, as shown in Fig. 3, be composed of a plurality of strips $e$, of metal, secured to the frame A by means of the plugs $c$, formed upon said frame and at a short distance from each other. This construction in many cases, on account of its simplicity and convenience and cheapness in manufacture, will be preferred over that illustrated in Figs. 1, 2, and 4. The outer plates, when made up of these strips, perform the function of retaining the filaments $f$ in position in the electrode, and by reason of their separation from each other, as described, provide for the access of the electrolytic fluid to the inner frame and its free circulation about all parts of the same, the openings $d$ in the outer plates being in this case, of course, dispensed with.

The ribs $a$, instead of being arranged, as shown in Figs. 2 and 4, at right angles to the frame A, may be arranged at any other angle—for example, as shown in Fig. 5. It is also to be understood that the inner frame and outer plates may be united in any other suitable manner than that described—as, for example, by lapping their edges—though the manner described is preferable.

What I claim is—

1. The herein-described composite electrode for secondary batteries, consisting of outer plates B, provided with openings $d$, an inner frame A, having the ribs $a$, and the filaments or strips $f$ between said ribs, substantially as described.

2. The herein-described composite electrode for secondary batteries, consisting of an inner frame and outer plate or plates, the latter consisting of a plurality of strips of metal united to the inner frame and suitably distanced from each other to provide openings to the inner frame, substantially as described.

In testimony whereof I have hereunto set my hand in the presence of two subscribing witnesses.

ABRAHAM V. MESEROLE.

Witnesses:
J. J. KENNEDY,
T. H. PALMER.